(12) United States Patent
Reboni et al.

(10) Patent No.: US 8,417,048 B2
(45) Date of Patent: Apr. 9, 2013

(54) METHOD FOR CORRECTION OF DIGITAL IMAGES

(75) Inventors: Vol'demar O. Reboni, Sankt-Petersburg (RU); Anatoly I. Mazurov, Sankt-Petersburg (RU); Yan S. Leyferkus, Sankt-Petersburg (RU)

(73) Assignee: Zakrytoe akcionernoe obshchestvo "Impul's", Sankt-Petersburg (RU)

( * ) Notice: Subject to any disclaimer, the term of this patent is extended or adjusted under 35 U.S.C. 154(b) by 57 days.

(21) Appl. No.: 13/239,807

(22) Filed: Sep. 22, 2011

(65) Prior Publication Data

US 2012/0008849 A1 Jan. 12, 2012

Related U.S. Application Data

(63) Continuation of application No. PCT/RU2010/000612, filed on Oct. 21, 2010.

(30) Foreign Application Priority Data

Jun. 8, 2010 (RU) .............................. 2010123733

(51) Int. Cl.
*G06K 9/40* (2006.01)
*G06K 9/00* (2006.01)
(52) U.S. Cl.
USPC .......................................... 382/254; 382/132
(58) Field of Classification Search .................. 382/254, 382/266, 274, 275, 240, 132
See application file for complete search history.

(56) References Cited

U.S. PATENT DOCUMENTS 7,149,358 B2 * 12/2006 Langan ......................... 382/214

2003/0161519 A1 8/2003 Vuylsteke
2005/0141780 A1 * 6/2005 Takahashi ..................... 382/260
2008/0205785 A1 * 8/2008 Geiger et al. ................. 382/260

FOREIGN PATENT DOCUMENTS

EP 1345170 A1 9/2003
EP 2120040 A1 11/2009

OTHER PUBLICATIONS

Sorenson, J.N. et al., "Scattered Radiation in Chest Radiography", Progress in Medical Imaging, 1988 pp. 159-184.
Maher K.P. et al., "Computerized Scatter Correction in Diagnostic Radiology", Contemporary Physics, 1997, vol. 38, No. 2, pp. 131-148.
Love L. et al., "Scattered Estimation for a Digital Radiographic System Using Convolution Filtering", Medical Physics, 1987, vol. 14, No. 2, pp. 178-185.
International Search Report dated Mar. 15, 2011 from corresponding International Patent Application No. PCT/RU2010/000612 filed Oct. 21, 2010.

* cited by examiner

*Primary Examiner* — Yon Couso
(74) *Attorney, Agent, or Firm* — Patentbar International, P.C.

(57) ABSTRACT

The method for correction of a digital image acquired with the use of electromagnetic radiation including X-rays, converted into electric signal and sent to digital imaging device, is provided, comprising pyramidal decomposition of a digital image into detailed and approximation images, removal of scattered radiation in approximation part of the images, contrast enhancement in detailed part of the images, merging of processed detailed and approximation images, the following reconstruction and generation of the final image. The results of the embodiment of this method comprise removal (reduction) of the scattered radiation component, noise reduction, correction of the dynamic range of the output image in accordance with the dynamic range of the output device, and scaling of the dynamic range of the output image in accordance with the dynamic range of the original image.

5 Claims, 7 Drawing Sheets

METHOD FOR CORRECTION OF DIGITAL IMAGES

CROSS-REFERENCE TO RELATED APPLICATIONS

This Application is a Continuation application of International Application PCT/RU2010/000612 filed on Oct. 21, 2010, which in turn claims priority to Russian application No. RU2010123733 filed on Jun. 8, 2010, both of which are incorporated herein by reference in their entirety.

FIELD OF THE INVENTION

This invention relates to the field of digital image processing and can be used for the task of processing of digital images, acquired by means of use of high energy radiation, including the X-ray radiation.

BACKGROUND OF THE INVENTION

Irradiation of the object gives rise to scattered radiation, which has a strong effect on the detectability of details in the acquired images. Scattering leads to the reduction in contrast, densitometric imprecision and deterioration of image sharpness. Standard methods of treating the effects of scattered radiation usually directed towards reduction of the intensity of scattered radiation which reaches the image detector (Sorenson, J. A., and Niklason, L. T., 1988, Progress in Medical Imaging, edited by V. L. Newhouse (New York: Springer), pp. 159-184). In many instances implementation of such methods can lead to increase in the dose (by a factor of three or more) and in the noise of the acquired image.

Standard methods solve the task of reducing the effects of scatter in primary image by means of anti-scatter grids, air gaps and beam collimation. These approaches reduce the scatter component of total signal at the detector. However, they do not totally remove it, and they do not affect the veiling glare component directly. Also, the use of anti-scatter grids or air gaps leads to significant increase of the dose (patient exposure)(Sorenson, J. A., and Niklason, L. T., 1988, Progress in Medical Imaging, edited by V. L. Newhouse (New York: Springer), pp. 159-184).

Compensation of the scatter effects can be facilitated by use of computerized image processors connected to an image detector—such as in digital radiographic and fluoroscopic systems (Maher, K. P., and Malone, J. F., 1986, Contemp. Phys., 27, 533). Methods developed so far usually involve an estimation of scattered radiation field and its subtraction from the original image (Love. L. A., and Kruger, R. A., 1987, Medical Physics, 14, 178).

The method, most closely related to this claim, is the method of digital image correction (Patent No EP2120040A1, published 18 Nov. 2009), acquired by means of electromagnetic radiation, including X-ray radiation, which was converted into electric signal and sent to digital imaging device, which includes pyramidal (Laplacian pyramid) decomposition of initial digital image into detailed (high-frequency band) images and approximation (low-frequency band) images, removal of scattered radiation in the approximating part of the images, enhancing the contrast in the detailed part of the images, re-composition of processed approximation and detailed images, which followed by reconstruction and generation of the resulting image.

The drawback of the abovementioned method is that it doesn't provide the possibility of correction of amplitude and frequency properties of the image, noise reduction, removal of effects of scatter and correction of dynamic range of the image in accordance with dynamic range of the output device.

SUMMARY OF THE INVENTION

This technical result in the method for correction of digital image, acquired by means of electromagnetic radiation, including X-ray radiation, and converted into electric signal and sent to a digital imaging device, involving pyramidal decomposition of the original digital image into detalization and approximation images, scatter removal in approximation and approximation images, contrast enhancement of detalization images, re-composition of processed detailed and approximation images and concurrent reconstruction and output image getting is achieved by the following means: before the aforementioned operation of image decomposition the dynamic range of the image is determined and amplitude characteristic is adjusted; after the aforementioned operation of image decomposition signal-to-noise ratio is determined, noise reduction is performed in detailed images which are also adjusted in accordance with frequency characteristic adjustment coefficient, which is determined by dynamic range of the output device, MTF of original imaging device, predetermined (set) degree of correction of detailed images and signal-to-noise ratio, determined earlier. This is followed by adjustment of detailed images in accordance with preset adjustment coefficient and intensity of approximation images, correction of edge artifacts in detailed images, and after performing said reconstruction of the image the dynamic range of the output image is scaled according to dynamic range of the original digital image and the output image is sent to the output device.

Decomposition of the original digital image can be performed in accordance with Laplace's method or wavelet transform method.

Signal-to-noise ratio can be determined as a ratio of difference between maximum and minimum signal in approximation images and noise value for detailed images.

Edge artifact correction is performed by means of sigma function, parameters of which depend on maximum and minimum values of detailed images and MTF value for digital imaging device, used in determination of frequency characteristic correction coefficient.

BRIEF DESCRIPTION OF THE DRAWINGS

FIG. 1-13: example of embodiment of the invention, which illustrates the principles behind the claimed invention, and demonstrates the possibility of technical realization and the achievement of claimed technical result.

DETAILED DESCRIPTION OF THE PREFERRED EMBODIMENTS

Figure 1:
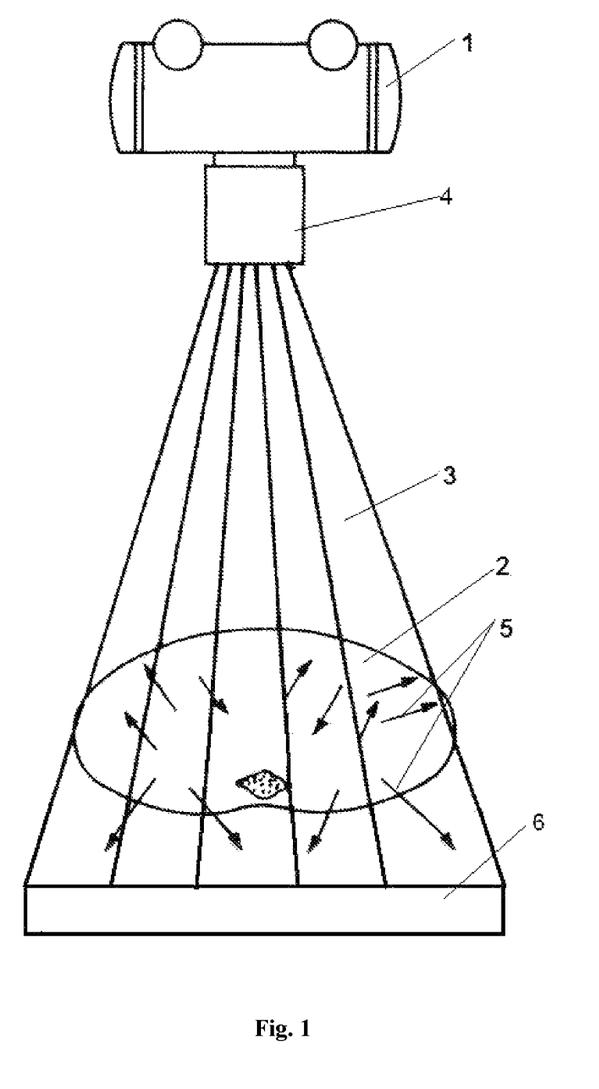
FIG. 1: Schematic diagram of X-ray image acquisition.

As shown in the FIG. 1, X-ray tube 1 with collimator 4 emits the X-ray beam 3 which passes through the object 2 under investigation. The X-ray radiation is detected by the digital imaging device (detector) 6 from which it is sent to the display.

After that the method is performed in the following sequence of operations (FIGS. 2-4) which is described below.

Figure 2:
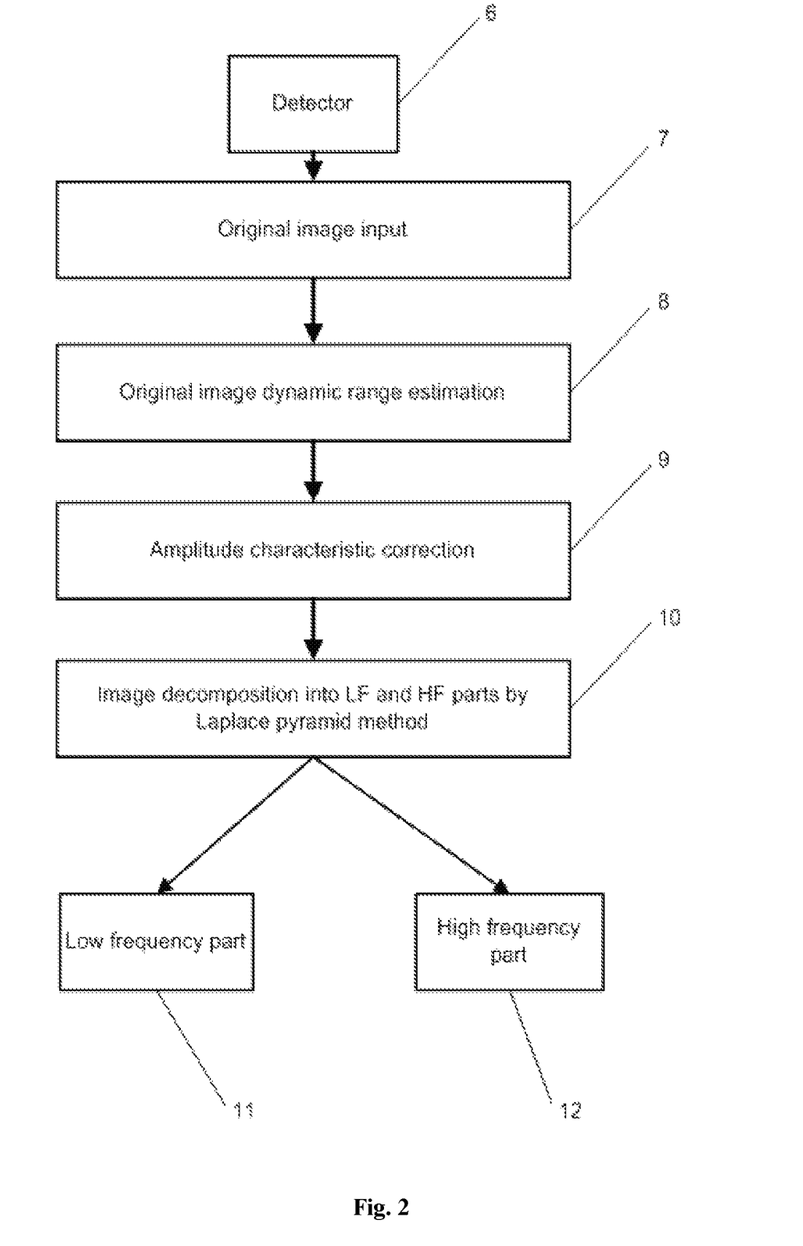
FIG. 2: The first part of the algorithm.

The MTF of detector 6 is determined;

The image to be processed is input ("the original image");

The dynamic range (min-max) of the original image is determined (pos. 8 in FIG. 2);

The amplitude characteristic of the image is adjusted (optional) (pos. 9 in FIG. 2). Logarithmic method can be used for the adjustment of the amplitude characteristic of the image. The signal of the original image has the following value:

$$U=U_0 \cdot e^{-\mu t}$$

where U—"original" signal, U→0 0—radiation dose (exposure), $\mu$—X-ray absorption factor for the object material, t—thickness of the object. After logarithmization of this equation becomes:

$$\ln U = \mu \times t + \ln u_0$$

Therefore, the output signal becomes proportional to total value of the X-ray attenuation factor.

The image is decomposed according to the Laplace pyramid method (pos. 10-12 in FIGS. 2 and 3), where the image is divided into the low frequency (LF) (approximating) part 11 and high frequency (HF) (detailed) part 12. These parts are concurrently divided 10 into LF and HF parts and so on.

Figure 3:
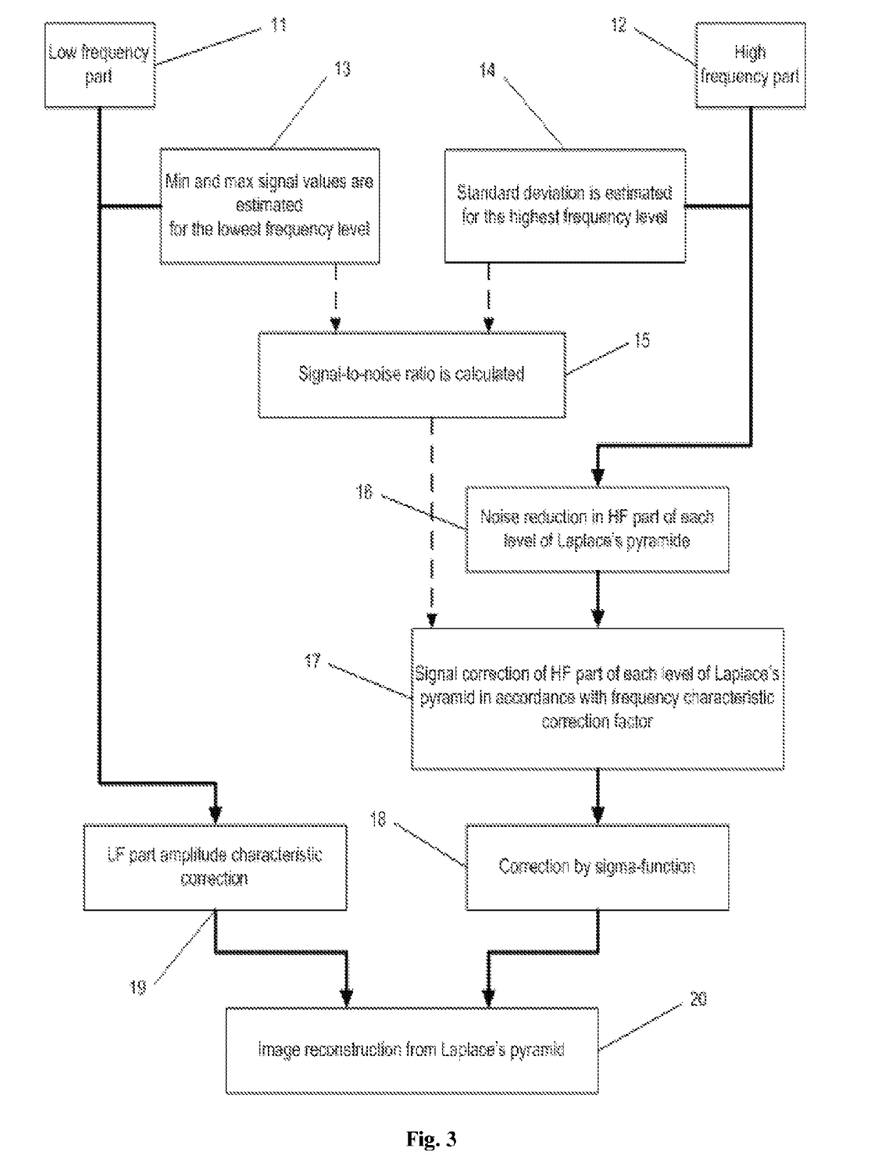
FIG. 3: The second part of the algorithm.

The signal-to-noise ratio (SNR) is determined as follows (FIG. 3):

the minimum (Min) and maximum (Max) value of the signal is determined for the lowest frequency level of the Laplace pyramid (Pos. 13 in FIG. 3);

the standard deviation is determined for the highest frequency level of the Laplace pyramid (which is equivalent to measuring the noise in this level) (Pos. 14 in FIG. 3);

the SNR is calculated in accordance with the following equation:

$$\frac{\text{Min} - \text{Max}}{\text{Noise}} = SNR$$

The noise reduction is performed in the following way: in each level of the Laplace pyramid high frequency part is processed with the separate noise reduction algorithm (Pos. 16 in FIG. 3), which can be based on the wavelet transform, local average, bilateral transform methods, etc. and their combination. The degree of the noise reduction can be set in advance within the range 0%-100%.

Subroutine of determination of the frequency characteristic correction coefficient is controlled by the following parameters (Pos. 17 in FIG. 3):

a) The dynamic range to which the original dynamic range of the image is limited in accordance with the dynamic range of the output device (film printer, computer monitor, etc.);

b) The MTF of the detector, with which the original image was acquired;

c) The degree of adjustment of high frequencies (HF gain) (set in % increase/reduction) (Pos. 16 in FIG. 3);

d) The value of SNR, determined previously (Pos. 15 in FIG. 3).

The HF images in each level of the pyramid are adjusted by means of the frequency characteristic correction coefficient, obtained at the stage of the amplitude characteristic correction by the certain function (Pos. 9 in FIG. 2). This correction is controlled by two parameters:

e) The correction coefficient, which was obtained during the determination of the dynamic range of the original image (Pos. 17 in FIG. 3);

f) The brightness of the LF part of the image in the same level of the pyramid (HF gain is inversely proportional to the brightness through some function or linear dependence);

To avoid the edge over-enhancement of image structures (edge artifacts) the minimum and the maximum values are determined in each HF part, and based on them the parameters of the sigma function, which is used for the processing of the HF parts of the image, are determined (Pos. 18 in FIG. 3).

Figure 4:
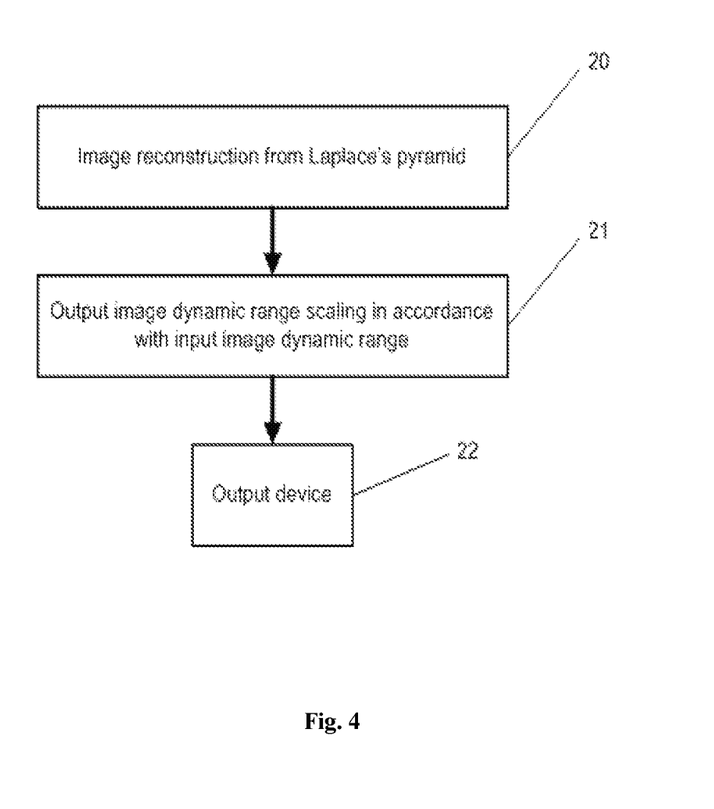
FIG. 4: The third part of the algorithm.

The reverse reconstruction of the image from Laplace pyramid is performed (Pos. 20 in FIGS. 3 and 4).

The dynamic range of the resulting image is scaled accordingly to the dynamic range of the original image (Pos. 21 in FIG. 4).

The processed image is sent to the output device (Pos. 22 in FIG. 4).

Figure 5:
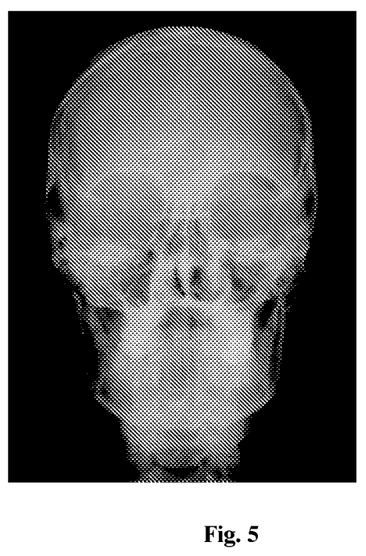
FIG. 5: The original digital image.
Figure 6:
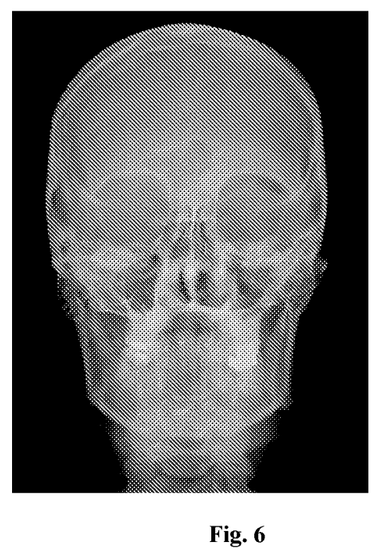
FIG. 6-8: Images processed according to the method of the claim.
Figure 7:
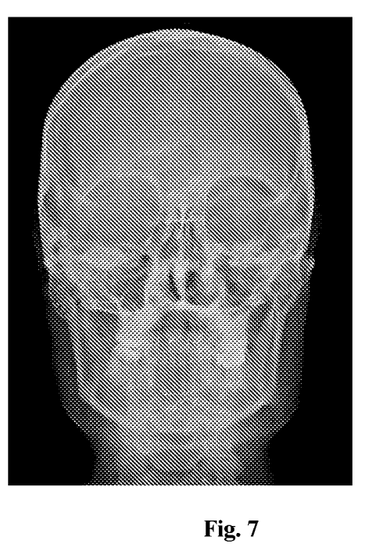
Figure 8:
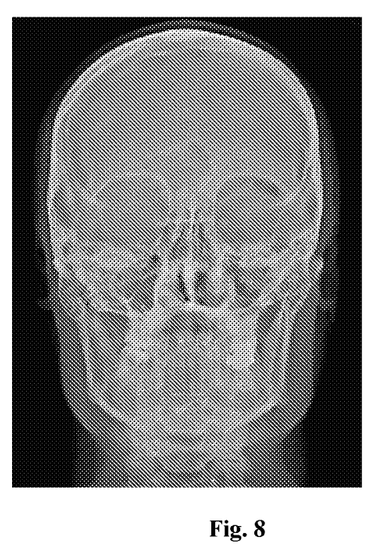

The possibility of achieving the technical result demonstrated in FIGS. 5-13. In FIG. 5 shown the original digital image, part of bone structure is not visible (dark areas).

In the image with light processing (FIG. 6) it is possible to see almost all bone structure. In the image with medium processing (FIG. 7) it is possible to see all of the bone structure and part of the soft tissue. In the image with heavy processing (FIG. 8) it is possible to see all of the bone structure and practically all of the soft tissue.

Figure 9:
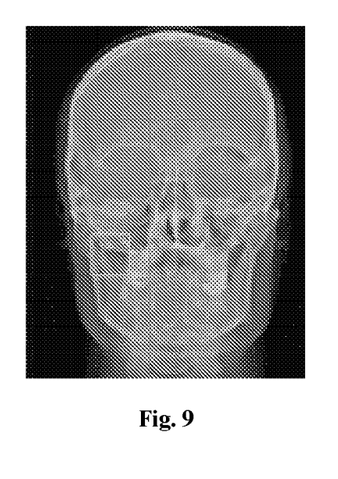
FIG. 9: The position of the fragment on the whole image.
Figure 10:
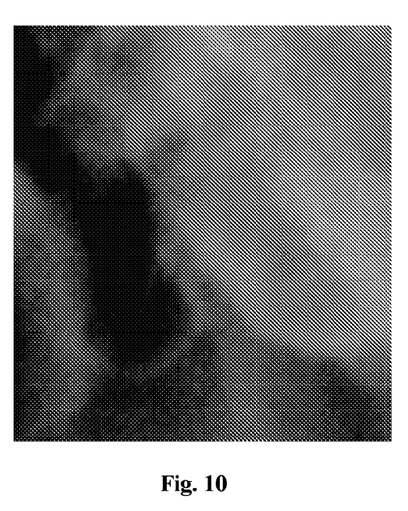
FIG. 10-13: Fragment of the image, processed according to the claimed method.
Figure 11:
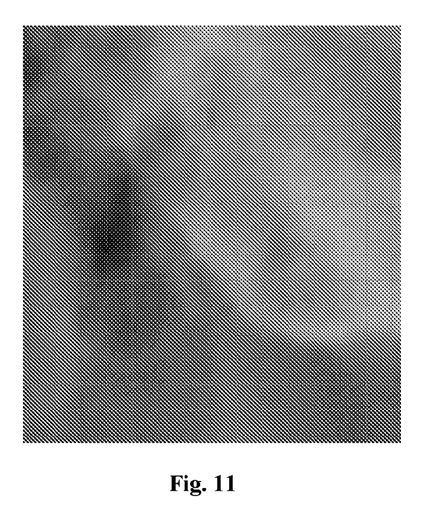
Figure 12:
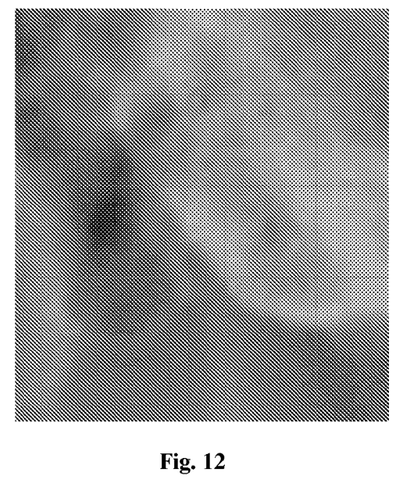
Figure 13:
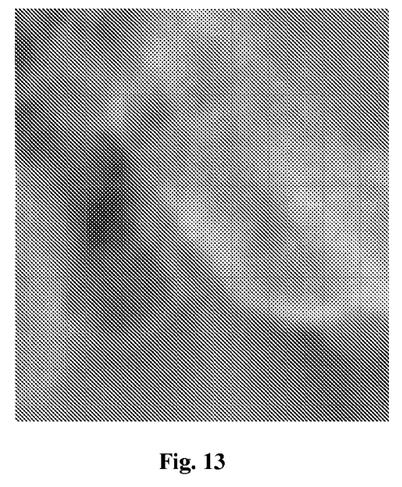

The FIG. 9 shows the position of the fragment on the whole image

On the fragment of the whole image (FIG. 10) it is possible to see the noise and lack of detalization.

On the fragment of the image with light processing (FIG. 11) the noise is removed and detalization is enhanced.

On the fragment of the image with medium (normal) processing (FIG. 12) the detalization is enhanced to the normal level.

On the fragment of the image with heavy processing (FIG. 13) all of the bone structure is visible in detail with acceptable noise level.

The examples of image processing with use of the method of the claim are demonstrated in FIGS. 5-13, which show the effect of two main parameters of the filter.

The first parameter—dynamic range of the output image in arbitrary units, which are related in their sense to the value Smax/Smin, where Smax—maximum value of the signal in the image, Smin—minimum value. The range of values is 16-2048.

The second parameter is the degree of noise reduction in percents. The range of values is 0-100%. 0%—there is no noise reduction; 100%—all noise is removed.

Parameters for the images in the Figures are as follows:

1. Light processing: dynamic range of the output image—256, degree of noise reduction—30%;

2. Normal processing: dynamic range of the output image—64, degree of noise reduction—60%;

3. Heavy processing: dynamic range of the output image—32, degree of noise reduction—90%.

INDUSTRIAL APPLICABILITY

Thus the technical result of the invention is achieved—correction of amplitude and frequency characteristics of the image, noise reduction, reduction of the effects of the scattered radiation and correction of the dynamic range of the image in accordance with the dynamic range of the prospective output device.

What is claimed is:

1. A method of correcting a digital image obtained using electromagnetic radiation, including X-rays, converted into an electric signal, and transmitted to a digital imaging device, comprising:
   pyramidal decomposition of the digital image into detailed images and approximation images;
   removal of scattered radiation in the approximation images to produce processed to approximation images;
   contrast enhancement of the detailed images to produce processed detailed images;
   combining the processed detailed images and the processed approximation images; and
   reconstruction and generation of a final image;
   and further comprising:
      before the decomposition,
         determining a dynamic range of the digital image and correcting amplitude characteristics of the digital image;
      after the decomposition,
         determining a signal-to-noise ratio,
         noise reduction in the detailed images,
         correcting the detailed images using a frequency characteristic correction coefficient determined by
            a dynamic range of an output device,
            a modulation transfer function of a digital imaging device forming the digital image,
            a set degree of correction of the detailed images, and
            the signal-to-noise ratio;
         correcting the detailed images using a correction coefficient and using a brightness of approximation images, and
         correcting edge artifacts in the detailed images; and
      after the reconstruction,
         scaling a dynamic range of the final image using the dynamic range of the digital image, and
         transmitting the final image to the output device.

2. The method of claim 1, wherein the decomposition of the digital image is performed by the Laplacian pyramid method.

3. The method of claim 1, wherein the decomposition of the digital image is to performed by the wavelet transform method.

4. The method of claim 1, wherein the signal-to-noise ratio is determined using a ratio of the difference between a maximum and a minimum value of a signal in the approximation images to a noise value for the detailed images.

5. The method of claim 1, wherein the correction of edge artifacts in the detailed images is performed
   by using a sigma function,
      wherein the parameters of the sigma function are determined using minimum and maximum values of the detailed images; and
   by using the modulation transfer function of the digital imaging device to determine the frequency characteristic correction coefficient.

* * * * *